United States Patent [19]

Holton et al.

[11] Patent Number: 5,437,547
[45] Date of Patent: Aug. 1, 1995

[54] APPARATUS FOR INJECTION MOLDING

[75] Inventors: Donald Holton, Narragansett, R.I.; Antony Gill, Rochester, Mich.

[73] Assignee: Becker Group, Inc., Warren, Mich.

[21] Appl. No.: 146,933

[22] Filed: Nov. 1, 1993

Related U.S. Application Data

[62] Division of Ser. No. 714,483, Jun. 13, 1991, Pat. No. 5,260,014.

[51] Int. Cl.⁶ .............................................. B29C 45/73
[52] U.S. Cl. .................................... 425/548; 249/80; 425/552; 425/DIG. 110
[58] Field of Search ............... 425/552, 548, DIG. 30, 425/DIG. 110, 547; 249/79, 80, 114.1, 134, 135

[56] References Cited

U.S. PATENT DOCUMENTS

| | | | |
|---|---|---|---|
| 2,317,597 | 4/1943 | Ford et al. | 249/79 |
| 2,366,435 | 1/1945 | Brown | 264/226 |
| 2,579,898 | 12/1951 | Brucker | 249/114.1 |
| 2,907,070 | 10/1959 | Van Hartesveldt | 249/80 |
| 3,067,470 | 12/1962 | Stickney et al. | 264/225 |
| 3,101,065 | 8/1963 | Kalis | 264/226 |
| 3,179,725 | 4/1965 | Shultz et al. | 264/220 |
| 3,638,299 | 2/1972 | Garner et al. | 264/220 |
| 3,723,584 | 3/1973 | Nussbaum | 264/220 |
| 3,723,585 | 3/1973 | Nussbaum | 264/219 |
| 3,811,175 | 5/1974 | Garner et al. | 264/227 |
| 3,846,533 | 11/1974 | Carrier | 264/220 |
| 3,871,060 | 3/1975 | Ladney, Jr. | 264/226 |
| 4,285,901 | 8/1981 | Yotsutsuji et al. | 264/225 |
| 4,601,867 | 7/1986 | Martell et al. | 264/226 |
| 4,659,056 | 4/1987 | Michard-Soret | 249/134 |
| 4,732,962 | 3/1988 | Atkins et al. | 523/443 |
| 4,744,849 | 5/1988 | Michard-Soret | 249/79 |
| 4,925,886 | 5/1990 | Atkins et al. | 523/443 |
| 5,169,549 | 12/1992 | Weber | 425/552 |
| 5,260,014 | 11/1993 | Holton et al. | 264/134 |

FOREIGN PATENT DOCUMENTS

| | | |
|---|---|---|
| 56-17216 | 2/1981 | Japan . |
| 63-67113 | 3/1988 | Japan . |
| 63-278808 | 11/1988 | Japan . |
| 3-10814 | 1/1991 | Japan .................. 425/552 |
| 1289691 | 9/1972 | United Kingdom ........... 264/225 |
| 1464386 | 2/1977 | United Kingdom . |

OTHER PUBLICATIONS

Stoeckhert, Klaus, "Mold-Making Handbook for the Plastics Engineer" Hanser Publishers, N.Y., 1983, pp. 262-263, 302-303.

Primary Examiner—Jay H. Woo
Assistant Examiner—Joseph Leyson
Attorney, Agent, or Firm—Willian Brinks Hofer Gilson & Lione

[57] ABSTRACT

Injection molds suitable for use in injection molding, structural foam molding, low-pressure injection molding, and gas-assisted injection molding of plastic articles are described. The injection molds contain a thin metal layer contoured on its outer surface to the shape of the article to be molded, a rigid thermoset plastic material cast upon the inner surface of the metal layer and supporting the metal layer, and heat transfer elements cast within the plastic material and located adjacent to the metal layer to transfer heat for the metal layer and the plastic material. Preferably the thin metal layer is nickel, the plastic material is epoxy, and the heat transfer elements are metal chips and heat transfer tubing. The injection molds of the present invention can be prepared at considerable cost and time savings relative to conventional injection molds.

18 Claims, 3 Drawing Sheets

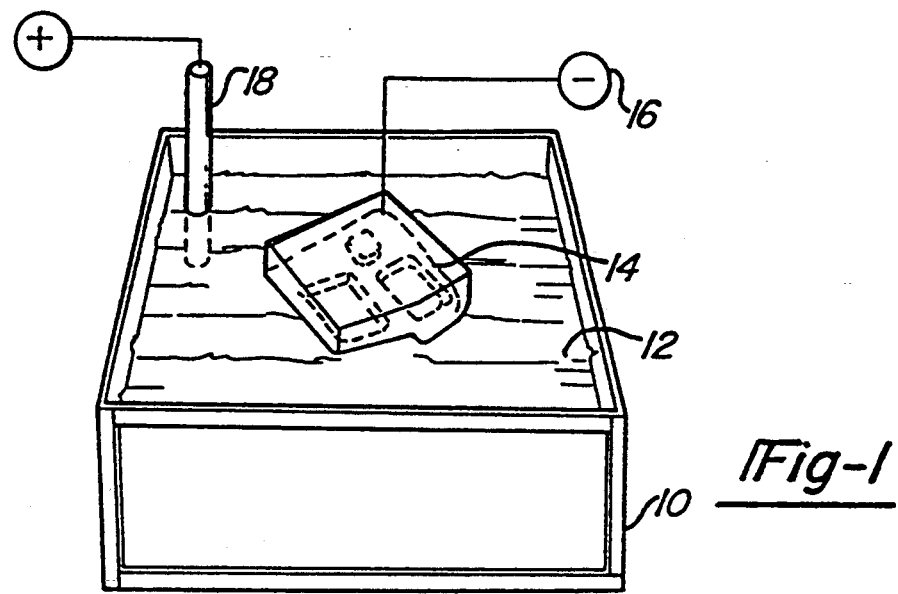
*Fig-1*
*Fig-2*
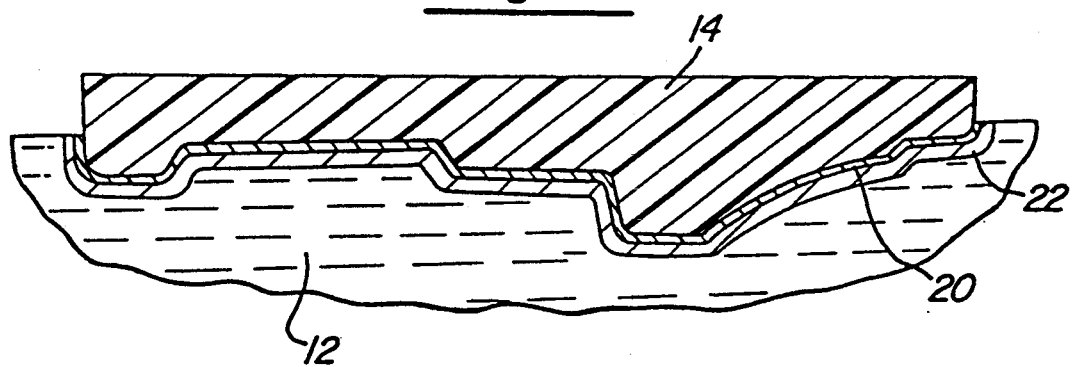
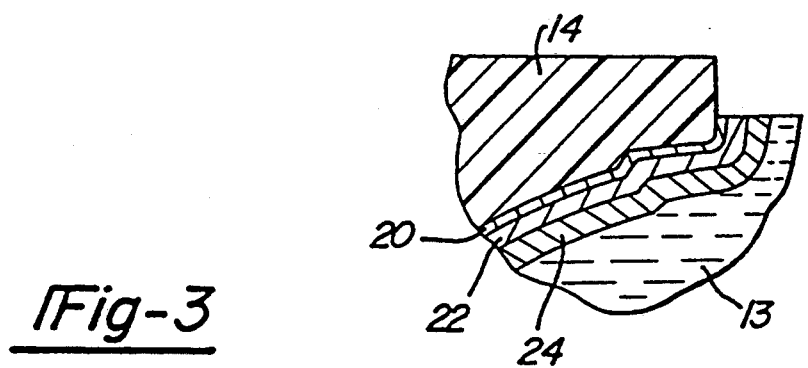
*Fig-3*

APPARATUS FOR INJECTION MOLDING

This is a divisional of application Ser. No. 07/714,483 filed on Jun. 13, 1991, now U.S. Pat. No. 5,260,014.

BACKGROUND OF THE INVENTION

1. Field of the Invention

The present invention relates to the preparation of plastic articles by injection molding. More particularly, this invention relates to an apparatus useful in the gas-assisted injection molding art. New and improved injection molds or tools have been discovered whereby molds suitable for injection molding, or gas-assisted injection molding, or other types of low pressure molding can be prepared much quicker and more economically than by conventional mold-building techniques and procedures.

2. Description of the Prior Art

Initially, injection molding involved the injection of a molten thermoplastic material into a relatively simple mold cavity, allowing the thermoplastic material to cool to form a molded article, and then opening the mold cavity to release the article. The articles formed were relatively simple in form and shape; the molds, therefore, were also relatively simple in both design and construction.

As the art advanced, however, it became desirable to manufacture larger and more complicated parts, including those having thick rib sections and complicated cross-sections. In addition, gas-assisted injection molding was found to be particularly suited for the manufacture of such complicated articles. Indeed, the development of gas-assisted injection molding has allowed for the preparation of even larger and more complex articles.

To fabricate such increasingly complex parts, injection molds have, of necessity, become more and more complex in both design and construction. Today, the design and construction of such complex injection molds represent a considerable expenditure of both time and capital.

Injection molds are generally prepared by one of two methods. In the first general technique, a steel block of the appropriate size is carefully machined to the desired shape, usually using numerical control machine (NCM) techniques. Such NCM techniques involve computer-driven machine tools. Hand finishing is required on ridges and other such complex features. A complicated mold surface can often take two to six months or more of very demanding and costly machining effort. And mistakes at any step of this procedure can, and often do, ruin the mold, thereby requiring the mold to be scraped and the process started anew. In addition, interconnecting channels for cooling must be drilled through the steel block, as well as channels for ejector pins, lifters, and the like. As is apparent to those skilled in the art, construction of such a mold requires considerable effort and, therefore, represents a large investment. Completed steel molds, however, are generally of high quality since the steel mold surfaces can take and hold a fine finish through repeated molding cycles.

In the second general procedure for the manufacture of injection molds, a model having the positive image of the desired article is prepared from wood or epoxy resin. Molten aluminum or zinc are then used to cast the model to produce the desired cavity. Although this procedure is generally faster and less expensive than the steel mold procedure just described, the procedure and the resulting cast mold can have significant limitations. Generally, this process cannot be used to create molds with complex features. Further, the aluminum/zinc molds do not have very good wear properties. Thus, the number of molded articles that can be prepared from such a cast mold is significantly reduced. Additionally, it is more difficult to polish the aluminum/zinc surface in order to obtain a smooth or "class-A" surface on the molded product. Furthermore, the use of molten aluminum and zinc baths involve considerable health and safety considerations.

It is desired, therefore, to provide injection molds and methods for constructing such molds which avoid many of the problems associated with the prior art techniques of mold construction. A mold which could be prepared relatively quickly and at a lower cost would be particularly desirable. It is also desirable that such a mold have a surface which can accept a polished or grained finish and that can withstand repeated injection cycles. The present invention provides such molds as well as methods for their production.

SUMMARY OF THE INVENTION

In accordance with this invention, there is provided a method for the construction of injection molds which are suitable for use in conventional injection molding, including reaction injection molding. These injection molds are especially useful in gas-assisted injection molding because of the lower molding pressures generally used therein. Additionally, injection molds which are suitable for use in injection molding and which are especially useful in gas-assisted injection molding are described. The molds of the present invention can generally be used in any low pressure molding process. Furthermore, in accordance with this invention, there is provided a method for the production of plastic articles using the injection molds described herein. The injection molds of this invention can be prepared much quicker and at a much lower cost that conventional prior art injection molds.

One object of the present invention is to provide injection molds containing (1) a thin metal layer contoured on its outer surface to the shape of an article to be molded, (2) a rigid material cast upon the inner surface of the metal layer and supporting the metal layer, and (3) heat transfer elements cast within the rigid material and located adjacent to the metal layer to transfer heat from the metal layer and the rigid material. As detailed below, it is preferred that the thin metal layer is nickel; that the rigid material is a rigid plastic material and, most preferably, a rigid thermoset plastic material, of which epoxy is the most preferred; and that the heat transfer elements include metal chips and heat transfer tubing. The rigid material used to support the thin metal layer should be sufficiently rigid and possess a sufficiently high compressive strength to prevent, or at least minimize, movement or deflection of the thin metal surface during the molding process. For purposes of this invention, "rigid materials" include thermoplastics, thermoset plastics, and composite materials, as well as other rigid materials such as concrete and plaster of paris.

Another object of the present invention is to provide injection molds which have, in order, (a) a metallic layer forming the interior surface of the mold; (b) a first thermoset plastic layer which contains (1) metal chips and (2) heat transfer tubing for the circulation of a heat transfer medium through the mold, wherein the tubing is adjacent to the metallic layer; and (c) a second thermoset plastic layer. Preferably, the metallic layer is nickel and the first and second thermoset plastic layers are epoxy.

Another object of the present invention is to provide injection molds which have, in order, (a) a first metallic layer forming the interior surface of the mold (b) a second metallic layer; (c) a first thermoset plastic layer which contains (1) metal chips and (2) heat transfer tubing for the circulation of a heat transfer medium through the mold, wherein the tubing is adjacent to the second metallic layer; and (d) a second thermoset plastic layer. Preferably, the first metallic layer is nickel, the second metallic layer is copper or zinc, and the first and second thermoset plastic layers are epoxy.

Still another object of this present invention is to provide a method of forming a molded plastic particle, which method comprises:
  (a) injecting molten thermoplastic material into an injection mold cavity;
  (b) injecting a pressurized gas into the molten thermoplastic material contained within the injection mold cavity, thereby forcing the molten thermoplastic material to conform to the shape of the injection mold cavity;
  (c) allowing the molten thermoplastic material to set up within the injection mold cavity;
  (d) venting the pressurized gas from the injection mold cavity to atmosphere; and
  (e) removing the molded plastic part from the injection mold cavity;
wherein the injection mold cavity is formed by a two-part injection mold, where each part has, in order,
  (1) a metallic layer which forms the interior surface of the injection mold cavity which contacts the molten thermoplastic material;
  (2) a first plastic layer which contains (1) metal chips and (2) tubing for the circulation of a heat transfer medium through the mold, wherein the tubing is adjacent to the metallic layer; and
  (3) a second plastic layer. Preferably, the metallic layer is nickel and the first and second plastic layers are thermoset plastic layers. More preferably, the thermoset plastic layer are epoxy.

Still a further object of the present invention is to provide a process for preparing an injection mold, where each part of the injection mold forming an article cavity is prepared by the process comprising the following steps:
  (1) forming a mold blank with the image of one side of an article to be molded;
  (2) coating an electrically conductive material on the surfaces of the mold blank having the image;
  (3) electrodepositing a metallic layer on the coated surface of the mold blank;
  (4) placing heat transfer tubing adjacent to the exposed metallic surface so that the produced mold can be heated or cooled by the passage of a heat transfer medium through the tubing, where the tubing has an inlet and an outlet;
  (5) placing a mixture containing uncured thermoset plastic resin and metal chips on the exposed metallic surface so that the mixture covers the tubing and forms a first thermoset plastic resin layer over the metallic layer;
  (6) allowing the first thermoset plastic resin layer to cure;
  (7) placing uncured thermoset plastic resin over the cured first thermoset plastic resin layer to form a second thermoset plastic resin layer;
  (8) allowing the second thermoset plastic resin layer to cure; and
  (9) removing the mold blank to expose the metallic surface forming one side of the interior of the mold cavity. Preferably, the metallic layer is nickel and the first and second thermoset plastic resin layers are epoxy.

A still further object of this present invention is to provide a process for preparing an injection mold, where each part of the injection mold forming an article cavity is prepared by the process comprising the steps of:
  (1) forming a mold blank with the image of one side of an article to be molded;
  (2) coating a thin layer of electrically conductive material on the surfaces of the mold blank having the image;
  (3) electrodepositing a first metallic layer on the coated surface of the mold blank;
  (4) electrodepositing a second metallic layer on the first metallic layer;
  (5) placing heat transfer tubing adjacent to the exposed second metallic surface so that the produced mold can be heated or cooled by the passage of a heat transfer medium through the tubing, where the tubing has an inlet and an outlet;
  (6) placing a mixture containing uncured thermoset plastic resin and metal chips on the exposed second metallic surface so that the mixture covers the tubing and forms a first thermoset plastic resin layer over the second metallic layer;
  (7) allowing the first thermoset plastic resin layer to cure;
  (8) placing uncured thermoset plastic resin over the cured first thermoset plastic resin layer to form a second thermoset plastic resin layer;
  (9) allowing the second thermoset plastic resin layer to cure; and
  (10) removing the mold blank to expose the first metallic layer surface forming the interior of the mold cavity. Preferably, the first metallic layer is nickel, the second metallic layer is copper or zinc, and the first and second thermoset plastic resin layers are epoxy.

Other objects and advantages of the present invention will be apparent from a consideration of this specification, including the appended claims and accompanying drawings.

BRIEF DESCRIPTION OF THE DRAWINGS

FIG. 1 is a perspective view of an electodeposition bath suitable for depositing a nickel layer on an injection mold blank or, in another embodiment, depositing a copper or zinc layer on the nickel layer.

FIG. 2 is a sectional view showing a nickel layer being electrodeposited on a silver-coated injection mold blank.

FIG. 3 is a sectional view showing a copper layer being electrodeposited on the nickel layer, which in turned had been electrodeposited on a silver-coated injection mold blank as shown in FIG. 2.

The present invention is not to be limited to the details of construction and arrangement of parts as illustrated in the accompanying drawings as the invention is capable of other embodiments and of being practiced in various ways within the scope of the appended claims. Furthermore, the terminology used in this present specification is for the purpose of description and not of limitation.

DESCRIPTION OF THE PREFERRED EMBODIMENTS

The present invention is related to injection molds useful in injection molding and gas-assisted injection molding of plastic articles and to the preparation of such injection molds. The injection molds of the present invention contain, in order, a thin metal layer contoured on its outer surface to the shape of an article to be molded; a composite material cast upon the inner surface of the metal layer and supporting the metal layer; and heat transfer elements cast within the composite material and located adjacent to the metal layer to transfer heat from the metal layer and composite material. Generally, the metal layer can consist of any metal or mixture of metals which can be sprayed on the mold blanks using conventional flame spray, thermal spray, or plasma spray techniques or which can be electrodeposited on the mold blanks as described below. The electrodeposition technique is the preferred method of generating the metal layer. Nickel is the preferred metal for the injection molds of this invention because of its hardness, workability, ability to form a smooth molding surface, and electrodeposition characteristics. Preferably the composite material is a thermoset plastic material with epoxy being the most preferred. The preferred heat transfer elements are metal chips and heat transfer tubing. These preferred embodiments are described below.

Figure 4:
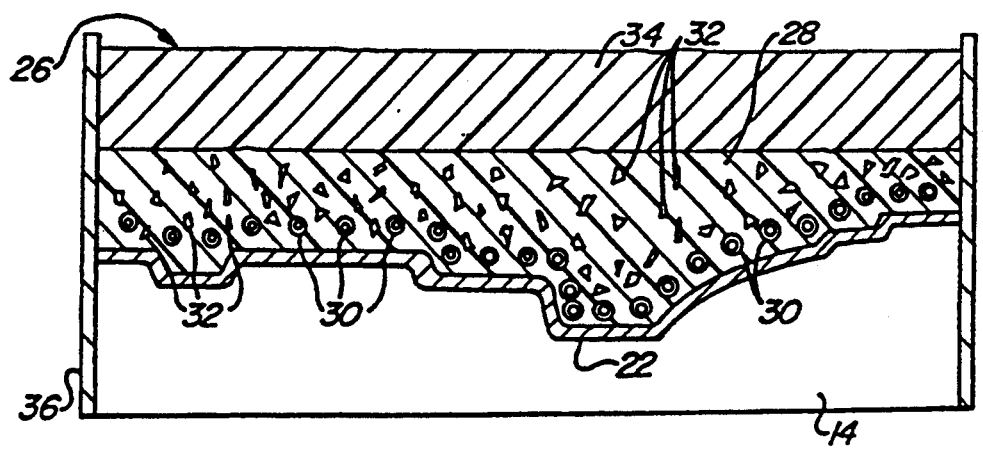
FIG. 4 is a sectional view showing two epoxy layers affixed to the nickel layer of the injection mold.

In one embodiment, the injection molds of the present invention contain, in order and as shown in FIGS. 3 and 4, a nickel layer 22 forming the interior surface of the mold; a first epoxy layer 28 which contains (1) metal chips 32 and (2) heat transfer tubing 30 for the circulation of a heat transfer medium through the mold, wherein the tubing 30 is adjacent to the nickel layer 22; and a second epoxy layer 34.

In another embodiment, the injection molds of the present invention contain, in order and as shown in FIGS. 3 and 4, a nickel layer 22 forming the interior surface of the mold; a copper or zinc layer 24; a first epoxy layer 28 which contains (1) metal chips 32 and (2) heat transfer tubing 30 for the circulation of a heat transfer medium through the mold, wherein the tubing 30 is adjacent to the copper or zinc layer 24; and a second epoxy layer 34.

Figure 7:
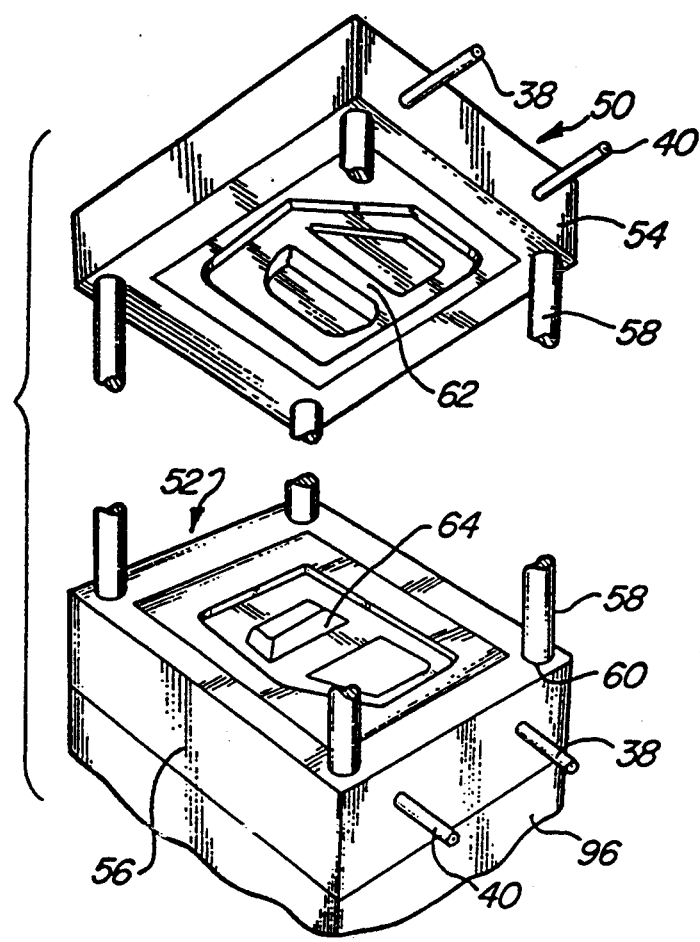
FIG. 7 is a perspective view of the completed injection mold showing both the cavity and core mold parts.

The nickel layer 22 forms the interior and thermoplastic-contacting surfaces of the completed mold as illustrated in FIG. 7. Depending on the application, the nickel layer 22, which can be formed by conventional flame spray, thermal spray, plasma spray or electrodeposition techniques should be, at a minimum, 0.005 inches thick and, in areas subject to pressure, at least 1/16 inch thick. Generally, electrodeposition techniques, as described below, are preferred. The thickness of the nickel layer can vary throughout the mold. Preferably the nickel layer is about ⅛ to ¾ inches thick, more preferably about ⅛ to ⅜ inches thick, and most preferably about ⅛ inches thick when the nickel layer is backed with a copper or zinc layer. When nickel is the only layer present, it is generally preferred that the thickness be between ⅛ and ⅜ inches. This surface can be polished or buffed, if desired, so as to obtain a very smooth or "class-A" surface in the molded articles produced using the injection molds of this invention. The nickel surface can also be grained, machined, or etched, if desired, to form a texture or other design on the mold. Additionally, minor changes can be made on design of the mold by machining. Naturally, the amount of such machining will be limited by the thickness of the nickel or metallic layer.

The strength of the mold can be increased by adding an optional layer 24 of copper or zinc (FIG. 3) between the nickel layer 22 and the first layer of epoxy 28. These metals are used because they have coefficients of thermal expansion similar to that of nickel as well as good heat conductivity. This copper or zinc layer is also formed by the electrodeposition of copper or zinc as more fully described below. The combined thickness of the nickel layer and the copper or zinc layer is preferably about ⅜ inch or more. Generally, the combined thickness of the metallic layers is more preferably in the range of ⅜ to ¾ inches. Where a thick metallic layer is desired, it is generally preferable to use a nickel layer followed by a copper or zinc layer, rather than only a single, thick nickel layer because of the relative electrodeposition rates of the metals. Higher electrodeposition rates are possible for copper or zinc relative to nickel. When a second metallic layer is used, copper is generally preferred.

The single nickel layer 22 or the nickel layer 22 and the optional copper or zinc layer 24 is backed by two layers of epoxy resin which, in the first layer 28, contains metal chips 32 and heat transfer tubing 30 for the circulation of a heat transfer medium through the mold. The thickness of the epoxy backing material will depend, in large part, on the size of the article to be molded. At a minimum, the first layer of epoxy should be thick enough to cover the heat transfer tubing. Generally, the first epoxy layer 28 should be about 1 to 6 inches thick. The second epoxy layer 34 should be thick enough to fill up the mold container 36. For larger parts, the thickness of the epoxy resin layers can be increased for added strength. And for smaller parts, the thickness of the epoxy resin layers, especially that of the second epoxy layer 34, can be reduced if desired.

Figure 5:
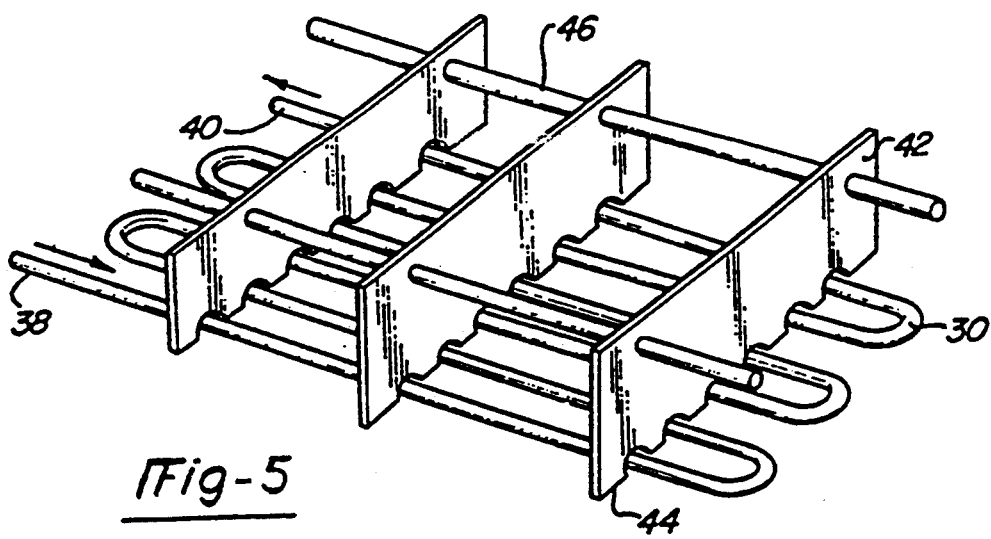
FIG. 5 is a perspective view showing the arrangement of the heat transfer tubing and the metal plates which, in the completed injection mold, can be embedded in the epoxy layers.
Figure 6:
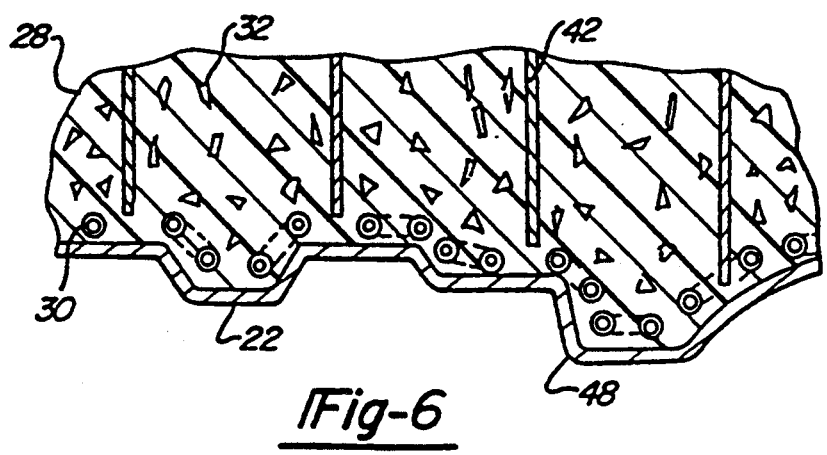
FIG. 6 is a sectional view of the injection mold of this invention showing the arrangement of the metal plates and heat transfer tubing.

The heat transfer tubing 30 in the first epoxy layer 28 is used to circulate a heat transfer medium through the mold. Generally, it is preferred that the tubing 30 be flexible so that it can easily be formed to the desired shape. The shape or path of the tubing within the mold will be dictated, in large part, by the shape of the plastic article to be formed. FIGS. 5 and 6 illustrate possible placement of the tubing 30 within the mold. It is preferred that the tubing be placed in close proximity to, but not in contact with, the nickel layer 22 as shown in FIG. 6. The tubing may be one continuous length with one inlet 38 and one outlet 40 (FIG. 5) or it may consist of a plurality of lengths with a corresponding number of inlets and outlets, thereby forming a number of heat transfer circuits within the mold. For larger and more complex molds, increasing the number of individual heat transfer circuits may be preferred both because they may be easier to design and because they allow different heating or cooling regimes within the mold.

When the mold is used in an injection molding machine, a heat transfer medium can be circulated through the tubing 30 as desired. Such a medium could include, for example, water, oil, siloxanes, or other liquid heat transfer fluids. Water is the preferred heat transfer medium. The heat transfer medium can be used to either heat or to cool the mold as desired during the injection molding process. The size of the heat transfer tubing will depend on the mold size and specific heat transfer requirements. Generally, however, ¼ to 1.5 inch diameter tubing will be suitable. Flexible copper tubing is an especially useful heat transfer tubing in the molds of this invention. As shown in FIG. 6, the tubing 30 is embedded within the first epoxy layer 28 and is in close proximity to the nickel layer 22 forming the exterior surface of the mold. Of course, the tubing 30 must be arranged before the epoxy resin forming the first epoxy layer 28 has cured or set (as is more fully described below). This invention allows the heat transfer tubing to be easily placed in those areas of the mold which have special requirements. For example, the tubing could loop several times around a complex feature in the mold which may need to be cooled especially quickly. Or a separate heat transfer tubing circuit could be installed in and around such a feature and a heat transfer medium held at a lower temperature than the heat transfer medium used the remainder of the mold could be used. The mold of the present invention are, therefore, especially suited to accommodate different heating and cooling requirements within the mold.

In addition to the heat transfer tubing 30, metal chips 32 are also embedded in the first epoxy layer 28. The purpose of the metal chips is to increase heat transfer from the metallic surface of the mold (i.e., the nickel layer or the nickel and copper or zinc layers) to the remainder of the mold, especially to the heat transfer tubing. The metal chips 32 are suspended throughout the first epoxy layer 28 and may, if desired, be suspended throughout the second epoxy layer 34. The concentration of the metal chips should be highest near the metallic surfaces of the mold and around the heat transfer tubing 30 to increase the effectiveness of the heat transfer medium. Suitable metal chips include aluminum, steel, iron, and the like. Combinations of metal chips may also be used. Aluminum chips are generally preferred because of weight considerations and their good thermal conductivity. The metal chips can be in any form such as spheres, flakes, rectangular-shapes, honeycomb-shapes, irregular-shapes, and the like, or combinations thereof. Generally, chips with a high surface area will be preferred because of the increased heat transfer capacity. Generally, metal flakes will be preferred because of their ability to "pack" or concentrate around the heat transfer tubing. The size of the metal chips should generally be in the range of about 1/16 to ⅜ inches, with particles of about ⅛ inch being most preferred. (The one dimension given refers to the largest dimension of the chips.) The most preferred metal chips are aluminum flakes of about 1/16 to ⅜ by 1/16 to ⅜ by 0.010 to 0.050 inches. Particles larger or smaller than these ranges can, however, be used. In addition to being embedded in the first epoxy layer 28, the metal chips can also be included in the second epoxy layer 34 if desired.

In addition to the metal chips 32, either or both of the epoxy layers 28 and 34 may contain other filler materials. Such additional fillers could include, for example, sand, silicon, aluminum oxides, and the like. Combinations of these filler materials may be used if desired. It is generally preferred that only the first epoxy layer contain metal chips and that the second epoxy layer contain lower-cost fillers. The preferred lower-cost filler is sand, with zirconium-containing sand being more preferred because of its high compression strength.

Metal plates 42, preferably steel plates, can be embedded in both the first and second epoxy layers (28 and 34), if desired, as illustrated in FIGS. 5 and 6. Generally, a plurality of steel plates are arranged in an approximately parallel manner to each other and approximately perpendicular to the metallic (nickel) surface 48 of the mold as illustrated in FIGS. 5 and 6. The leading or shaped edge 44 of the metal plates can be shaped to follow the approximate contour of the nickel surface 48 with cutouts or notches for the heat transfer tubing 30. This leading or shaped edge 44 should extend close to the metallic surface of the mold but should not touch the metallic layer of nickel, copper, or zinc. Generally, this leading or shaped edge 44 should be within about ½ to 1 inch from the inner boundary of the metallic layer or layers. In FIG. 5, the metal plates 42 are shown crossing the heat transfer tubing 30 at approximately 90 degrees. And in FIG. 6, the metal plates 42 are shown approximately parallel to the heat transfer tubing 30. Other arrangements are also possible. Generally, the steel plates are about 1/16 to ¼ inches thick and are preferably about ⅛ inch thick.

Although not wishing to limit the invention, it is thought that the metal plates 42 serve two related purposes. First, they provide added strength to the mold. Second, they will tend to isolate any exotherms generated during the molding process within specific areas of the mold, thereby preventing excessive movement or warping of the mold. Both of these effects will be of special importance in larger molds. Indeed, in the larger molds it may be advantageous to have the embedded metal plates arranged in a cross-hatched manner such that the plates form rectangular or squared shapes within the epoxy layers (i.e., "egg-crate" shaped). In addition, the metal plates may act as an additional heat transfer element.

The metal plates 42 are preferably embedded in both the first 28 and second 34 epoxy layers. It is possible, and may be preferred in smaller molds, to only embed the metal plates within the first epoxy layer 28, or to limit the distance the metal plates extend into the second epoxy layer 34. The spacings between the metal plates 42 will depend in large part on the size of the mold and the need for limiting and isolating the exotherms generated during molding. Generally, the spacing between the metal plates 42 should be about 1 to 6 inches and, preferably, about 2 to 4 inches. As with the heat transfer tubing, the metal plates should be arranged before the epoxy resin forming the first epoxy layer 28 has cured or set (as is more fully described below).

The injection molds of the present invention are prepared by electrodepositing a nickel layer 22 on a mold blank 14 which has been coated with an electrically conductive material 20, then, optionally, electrodepositing a copper or zinc layer 24 on the nickel layer; backing the metallic layers with two layers of epoxy resin including a first layer 28 of epoxy resin which contains heat transfer tubing 30 and metal chips 32 and a second layer 34 of epoxy resin; and then removing the mold blank.

The first step in preparing the injection molds of the present invention is the generation of the appropriate mold blank or model 14 or blanks as shown in FIG. 1. Normally, two mold blanks will be required. Complicated articles may require more than two mold parts and will, therefore, require more than two mold blanks. As shown in FIG. 7, these two-part molds have a core-forming surface 62 and a cavity-forming surface 64, which when mated together form the shape of the article to be molded. For more complex shapes, each side of the mold can have both cavity-like and core-like areas.

The actual shape of the mold blank or model will naturally depend on the desired shape of the molded article to be produced. The shape of the mold blank should be a positive image or duplication of the desired molded article. In other words, the surface of the mold blank will have the same shape as the surface of the desired article. The mold blanks can be prepared from easily workable materials, such as fiberglass, wood, or plastic material such as ABS resin, polypropylene, or other platable plastic polymers using known techniques such as machining, carving, shaping, and the like. Mold blanks from ABS plastic can also be prepared by stereolithographic techniques with laser etching. Fiberglass or ABS resin mold blanks are generally preferred.

Once the mold blank 14 is prepared, it is necessary to coat the actual molding surfaces and surfaces adjacent thereto (surfaces 62 and 64 in FIG. 7) with an electrically conductive material 20 so that nickel (or other suitable metallic material) can be electrodeposited on the mold blank. This coating material 20 should contain finely divided particles of metallic materials which will form a continuous film on the mold blank. Such a film can be applied by conventional techniques such as painting or spraying. Generally, spraying techniques will allow for thinner and more uniform coatings and are, therefore, preferred. The preferred coating material is metallic silver, preferably in a colloidal form. Preferably, this electrically conductive film is about 1 to 10 microns thick.

Once the mold blank 14 is coated with an electrically conductive material 20, a nickel layer 22 is electrodeposited thereon using conventional electrodeposition techniques. In FIG. 1, the mold blank 14 coated with, for example, silver (not shown) acts as the cathode 16. The mold blank is lowered into the deposition bath 10 containing the deposition solution 12 so that the silver coating contacts the deposition solution. The deposition tank 10 can act as the anode (not shown) or an appropriate metallic nickel anode 18 can be inserted into the bath. Preferably, a metallic nickel anode is used and the deposition tank 10 is an insulated steel tank. Conventional aqueous nickel compounds can be used in the deposition solution 12. Such nickel compounds include, for example, nickel sulfate and nickel chloride. Mixture of such nickel compounds may also be used. Other additives well known in the art can be added to help control deposition rates and the quality of the deposition layer. The voltage used is generally in the range of 1 to 10 volts and the deposition temperature is generally in the range of 70° to 150° F. Application of such a voltage will result in nickel being plated out on the silver-coated mold blank 14 (i.e. the cathode surface).

Deposition should continue until a nickel layer 22 of desired thickness is obtained. Generally, the nickel layer should be at least 1/16 inch and preferably ⅛ inch thick in the low current areas. Preferably the nickel layer is about ⅛ to ¾ inches thick, more preferably about ⅛ to ⅜ inches thick, and most preferably about ⅛ inches thick. FIG. 2 shows in cross-section the deposition of the nickel layer 22 on the silver layer 20 which was coated on mold blank 10 as it is immersed in the nickel deposition solution 12.

If desired, an additional metallic layer 24, preferably of either copper or zinc, can be applied directly on the nickel layer 22 by again using conventional flame spray, therma spray, plasma sprays or electrodeposition techniques. Generally, the electrodeposition techniques, which are described more fully below, are preferred. FIG. 3 illustrates in cross-section the electrodeposition of the copper or zinc layer 24 on the nickel layer 22 as the mold blank is immersed in the copper or zinc deposition solution 13. Conventional aqueous copper or zinc compounds can be used in the deposition solution 13. Such copper compounds include, for example, copper sulfate and copper cyanide. Such zinc compounds include, for example, zinc sulfate and zinc cyanide. Additives well known in the art can be added to help control deposition rates and the quality of the deposition layer. The voltage used is generally in the range of 1 to 10 volts. Application of such a voltage will result in copper or zinc being plated out on the nickel layer 22 (i.e. the cathode surface). Deposition should continue until a copper or zinc layer 24 of desired thickness is obtained. Generally, the combined thickness of the nickel layer and the copper or zinc layer should be at least ⅜ inches. More preferably, the combined thickness should be about ⅜ to ¾ inches.

Once the metallic layers have been electrodeposited, the epoxy backing layers can be added. This can most easily be carried out by placing the mold blank with its metallic layer or layers into container 36 as illustrated in FIG. 4 wherein the epoxy layers 28 and 34 can simply be poured into the container and allowed to cure. Preferably, the container 36 is the core retaining plate 54 or the cavity retaining plate 56 (as shown in FIG. 7) so that the epoxy-backed mold or tool can be inserted directly into the mold assembly 94 as shown in FIG. 8.

Figure 8:
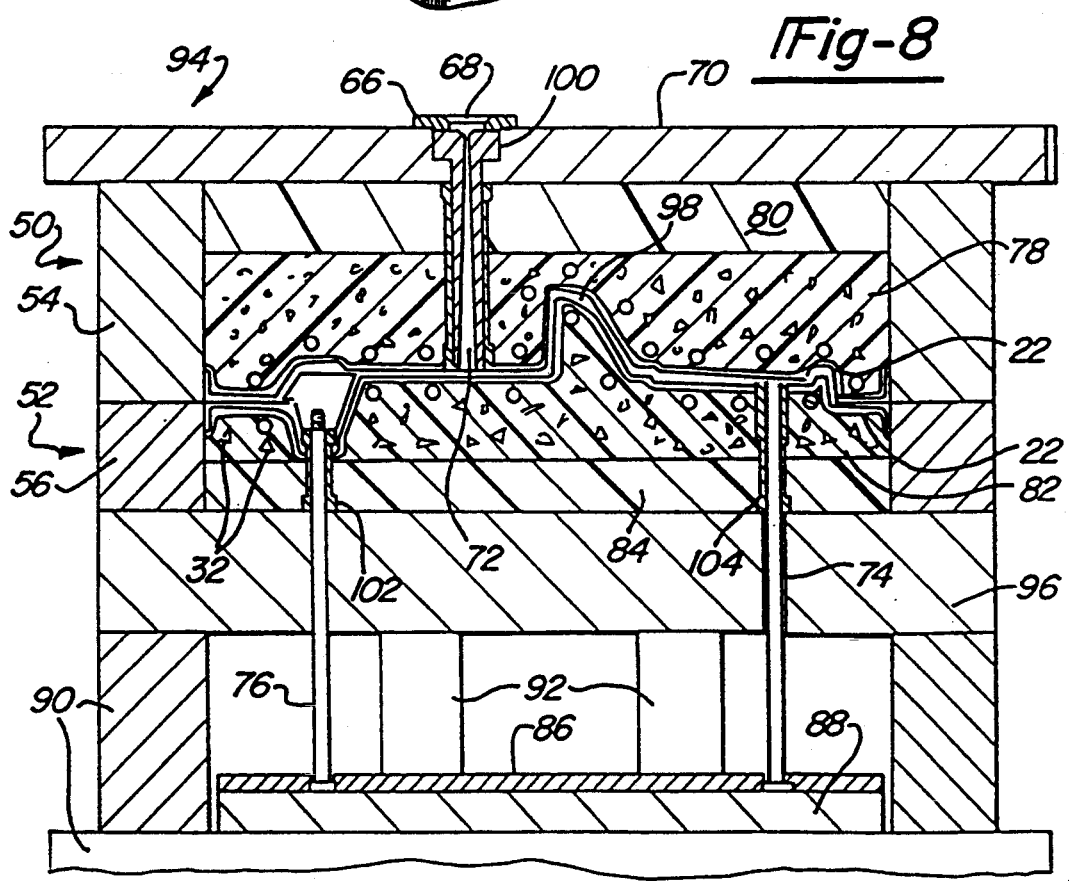
FIG. 8 is a sectional view showing a completed two-part injection mold.

Prior to filling the container 36 with the first layer of epoxy, access can be provided for specialized mold components such as the sprue 72, the lifter 76, and the ejector pin 74 in FIG. 8. The present inventive method is especially suit for incorporation of such i components. Such components can be accommodated by simply placing spacers or sleeves of the appropriate size and shape in the container before the epoxy backing is introduced. Once the epoxy is cured these spaces or sleeves can be removed leaving a hollow core into which the components can be inserted and fixed in place with additional epoxy resin. Alternatively, sleeves (such as sleeves 102 and 104 in FIG. 8) into which the components can be inserted can be placed in the container at the appropriate location and left in place after the epoxy cures. The components could then be inserted directly into the cured-in-place sleeves. Other components, such as thermocouples, can be placed in a similar manner.

Likewise, the heat transfer tubing 30, preferably flexible copper tubing, should be incorporated into the mold assembly prior to pouring at least the majority of the epoxy resin into the container 36. The heat transfer tubing 30 should be placed in those areas of the mold where heating or cooling are desired. Such tubing should not come in direct contact with the nickel layer 22 or, if used, the copper or zinc layer 24. Rather, the tubing should be displaced slightly from such metallic layers. The tubing could be suspended by wires or like devices in the container before adding the epoxy. Or the tubing could be placed on spacers directly on the metallic layers. Or an amount of epoxy resin sufficient to cover the metallic surfaces could be placed in the container before adding the tubing, thereby forming an epoxy "bed" upon which the tubing can be placed. The size of the heat transfer tubing will depend on the mold size and the specific heat transfer requirements. Generally, however, ¼ to 1.5 inch diameter tubing will be suitable. As noted above, the mold designer has considerable latitude in the placement of the heat transfer tubing and can, therefore, easily customize the tubing arrangement as needed for optimum mold performance.

Conventional epoxy resins can be used to provide the backing layers for the injection molds of this invention. Generally, epoxy resins which cure at room temperature or at slightly elevated temperatures are preferred. The epoxy resin should preferably have a pot life sufficient to make adjustment to the heat transfer tubing 30 or other components to be incorporated into the mold. Further, the cured resin should have good compressive strength at the elevated temperatures found within the mold during molding operations. Suitable epoxy resins for use in this invention include epoxies based on the reaction of bisphenol A and epichlorohydrin; aliphatic epoxies including glycidylated (epoxidized) alcohols, glycols, and polyols; cycloaliphatic epoxies; multifunctional epoxies including epoxies based on the reaction of epichlorohydrin with either amines or phenols, epoxies based on aromatic amines in which the amine hydrogens are epoxidized, and a trifunctional epoxy based on paraminophenol; as well as mixtures of these epoxies. Especially preferred epoxy resins include materials sold under the trade names XP3802, RP4026, and RP1501 from Ciba-Geigy Corporation. Those skilled in the art will appreciate that other epoxy resins can also be used and that the disclosure herein of suitable materials is not intended as limiting or excluding the use of other materials.

The epoxy is applied in two layers (28 and 34 in FIG. 4). The first layer of epoxy 28 is filled with metal chips 32 to improve the heat transfer ability of the epoxy layer. The second epoxy layer 34 may, if desired, also be filled with similar metal chips 32. If both epoxy 26 layers contain metal chips, then the two layers could be, if desired, be poured at the same time. In such a case, the two layers would effectively become a single layer. Generally, it is preferred that only the first epoxy layer contain the metal chips. The concentration of the metal chips should be highest near the metallic surfaces of the mold and around the heat transfer tubing 30 to increase the effectiveness of the heat transfer medium. This increased concentration of metal chips near the metallic surfaces of the mold and the heat transfer tubing can be accomplished in several ways. For example, the first epoxy layer 28 can be poured in stages with the first resin added having a higher concentration of metal chips. Or the container 36 could be vibrated, using, for example, an air-driven vibrator, after the metal chip-containing epoxy resin is added in order to compact and concentrate the metal chips around the heat transfer tubing and near the metallic surfaces of the mold. Epoxy resins mixtures containing up to about 60 weight percent metal chips may be used. With higher concentrations it may be difficult to ensure that the chips are embedded in the resin.

Suitable metal chips include aluminum, steel, iron, and the like, as well as combinations of such metal chips. Aluminum chips are generally preferred because of weight considerations and their good thermal conductivity. The metal chips can be in any form such as spheres, flakes, rectangular-shapes, honeycomb-shapes, irregular-shapes, and the like. Generally, chips with a high surface area will be preferred because of the increased heat transfer capacity. Generally, metal flakes are preferred because of their ability to "pack" or concentrate around the heat transfer tubing. The size of the metal chips should be generally in the range of about 1/16 to ⅜ inches, with particles of about ⅛ inch being most preferred. (The single dimension given refers to the largest dimension of the particles.) The most preferred metal chips are aluminum flakes of about 1/16 to ⅜ by 1/16 to 3/18 by 0.010 to 0.050 inches. Particles larger or smaller than these ranges can, however, be used. Suitable aluminum flakes are sold under the trade names RP38 and RP39 by Ciba-Geigy Corporation. Those skilled in the art will appreciate that other types of metal chips or other types of aluminum flakes can be used and that the disclosure herein of suitable aluminum flakes is not intended as limited or excluding the use of other materials. In addition to being embedded in the first epoxy layer 28, the metal chips can also be included in the second epoxy layer 34 if desired.

In addition to the metal chips 32, either or both of the epoxy layers 28 and 34 may contain other filler materials. Such additional fillers could include, for example, sand, silicas, aluminum oxides, and the like. Combination of these fillers may also be used. These fillers may be incorporated into the resins before resins are added to the container 36. It is preferred that only the first epoxy layer contain metal chips and that the second epoxy layer contain lower cost fillers. The preferred filler for the second epoxy layer is sand, with zirconium-containing sand being more preferred because of its high compressive strength.

Metal plates 42, preferably steel plates, can be embedded in both the first and second epoxy layers (28 and 34), if desired, as illustrated in FIGS. 5 and 6. Generally, a plurality of steel plates are arranged in an approximately parallel manner to each other and approximately perpendicular to the metallic (nickel) surface 48 of the mold as illustrated in FIGS. 5 and 6. The leading or shaped edge of the metal plates can be shaped to follow the approximate contour of the nickel surface 48 with cutouts or notches for the heat transfer tubing 30. This leading or shaped edge 44 should extend close to the metallic surface of the mold but should not touch the metallic layer of nickel, copper, or zinc. Generally, this leading or shaped edge should be within about ½ to 1 inch from the inner boundary of the metallic layer or layers. In FIG. 5, the metal plates 42 are shown crossing the heat transfer tubing 30 at approximately 90 degrees. And in FIG. 6, the metal plates 42 are shown approximately parallel to the heat transfer tubing 30. Other arrangements are also possible. Indeed, the metal plates 42 could be arranged in a cross-hatched or "egg-crate" manner (essentially combining the metal plates of FIGS. 5 and 6 in the same mold). Such an arrangement may be especially useful in larger molds. Generally, the steel plates or strips are about 1/16 to ¼ inches thick and are preferably about ⅛ inch thick.

These metal plates can be placed in the desired locations by any suitable means prior to adding the epoxy backing. For example, the metal plates could be suspended in the container 36 in the appropriate locations as the first epoxy layer 28 is added. After the first layer of epoxy resin cures, the suspending means could be removed, and the second layer of epoxy resin 34 added, thereby embedding the metal plates. These metal plates can be added individually or as multiple units containing more than one plate or as a single unit containing all the plates. Where units of plates are added, the plates making up that unit can be rigidly joined by any appropriate manner. For example, the plates could be joined using metal bars 46 extending through the upper ends of the plates as shown in FIG. 5. Or the plates could be tack welded to a bar(s) or rod(s) placed along the upper ends of the plates (not shown). Generally, it is preferred that these metal plates be completely embedded in the first and second layers of epoxy, thereby encapsulating the metal plates in the resin. If desired, however, the edges of the metal plates may extend from the second epoxy layer.

The layers of epoxy resin are allowed to cure. Generally, the first layer is allowed to cure or at least partially cure before the second layer is added. But, as indicated above, in some instances both layers will be added at essentially the same time. Curing of the epoxy resin will normally proceed at room temperature. For some resins, however, elevated temperatures will be required. In such cases, the entire container can be placed in a suitable oven. Or heater elements connected to the outside of the container 36 can be used. Or the resin can be heated internally by passage of a suitable heat transfer fluid through the heat transfer tubing 30.

Once the epoxy resin has cured, the mold blank is removed thereby exposing the nickel layer 22 which forms the mold cavity surface. Generally, the mold bank can be drilled and tapped so that bolts can be inserted. The mold blank can simply be pulled (using the inserted bolts for leverage) to separate the mold from the blank. The nickel surface can be polished or finished as desired. Such polishing or buffing should remove the silver coating. Preferably, the nickel surface is diamond polished in order to produce a molding surface capable of yielding plastic article with class-A surfaces. Or, if desired, any silver adhering to the nickel layer could be removed using an acid wash, such as dilute nitric acid. At this point the mold is ready for use and, after the addition of the sprue, runners, etc., can be used in the same manner as a conventional injection mold.

FIG. 8 illustrates the mold assembly 94 using the injection molds of this invention. Generally, two separate molds or molds halves are used to define the cavity 98 in which the plastic article will be made. Referring to FIG. 7, these mold halves include the cavity mold part 52 and the core mold part 50. The core mold part 50 includes a core retaining plate 54, leader pins 58 for alignment of the two mold halves, and the core-forming nickel surface 62. The cavity mold part 52 includes a cavity retaining plate 56, leader pin bushings 60 for acceptance of the leader pins 64 of the core mold part 50, and the cavity-forming nickel surface 64. Each mold half has its own inlet 38 and outlet 40 for passage of the heat transfer fluid through the mold parts. The cavity mold part 52 and the core mold part 50 are combined in the mold assembly 94 as shown in FIG. 8.

Referring to FIG. 8, molten plastic is injected from the nozzle of an injection machine (not shown) into the mold assembly 94 through the sprue bushing 6A, which is mounted in the locating ring 66 on the clamp plate 70. The molten plastic flows through the sprue 72, located in the sprue bushing housing 100, into the article cavity 98. The sprue bushing housing 100 and the sprue 72 extend down through the core mold part 50; the sprue 72 communicates with the article cavity 98. In gas-assisted injection molding, a gas is injected into the molten plastic thereby forcing the molten plastic to conform to the shape of the article cavity 98. The injected gas can be air or an inert gas such as nitrogen, carbon dioxide, argon, or the like. The preferred gas is nitrogen. (Neither the plastic nor gas injection means are illustrated in FIG. 8.) The article cavity 98 is defined by the cavity-forming nickel surface 64 and the core-forming nickel surface 62 as shown in FIG. 7. Again referring to FIG. 8, within the mold assembly 94 is located the cavity mold part 52 and the core mold part 50. The core mold part 50 contains the core retaining plate 54; the first core-epoxy layer 78, which also contains heat transfer tubing 30 and metal chips 32; and the second core-epoxy layer 80. The cavity mold part 52 contains the cavity retaining plate 56; the first cavity-epoxy layer 82, which also contains heat transfer tubing 30 and metal chips 32; and the second cavity-epoxy layer 84. The lifter pin 76 and the ejector pin 74, which are used to assist in removing the plastic article after molding, extend through the cavity mold part 52 and the support plate 96 from the ejector plate 88 and the ejector retaining plate 86, both of which are contained in the ejector housing 90. The support plate 96 and the support pillars 92 are used to increase the strength and rigidity of the mold assembly. Once the molded plastic part has cooled sufficiently, the cavity mold part 52 and the core mold part 50 are separated and the plastic part removed.

In general, the injection mold of the present invention can be used with the same thermoplastic materials and with the same molding technology to form plastic articles as with conventional steel or cast molds. The molds of the present invention, however, offer significant advantages over the prior art molds. Conventional molding techniques are described, for example, in U.S. Pat. Nos. 4,101,617, 4,781,554, 4,824,732, 4,923,666, 4,923,667, and 4,943,407, which are hereby incorporated by reference, and in U.S. patent application Ser. No. 07/628,746 filed on Dec. 17, 1990, which is assigned to the same assignee as the present invention and which is also incorporated by reference.

That which is claimed is:

1. An injection mold comprising, in order,
  (a) a thin metallic layer forming an interior surface of the mold for molding an article;
  (b) a first thermoset plastic layer which contains (1) metal chips and (2) heat transfer tubing for the circulation of a heat transfer medium through the mold, wherein the tubing is adjacent to the metallic layer;
  (c) a second thermoset plastic layer; and
  (d) a plurality of metal plates embedded within both the first and second thermoset plastic layers, said plates approximately perpendicular to the metallic layer.

2. An injection mold as defined in claim 1, wherein the metallic layer is a nickel layer and the first and second thermoset plastic layers are epoxy.

3. An injection mold as defined in claim 2, wherein the nickel layer is approximately ⅛ to ¾ inches thick.

4. An injection mold as defined in claim 3, wherein the nickel layer is approximately ⅛ to ⅜ inches thick.

5. An injection mold as defined in claim 2, wherein the metal chips are aluminum chips.

6. An injection mold as defined in claim 5, wherein the aluminum chips are flakes of about 1/16 to ⅜ by 1/16 to ⅜ by 0.010 to 0.050 inches.

7. An injection mold as defined in claim 2, wherein the heat transfer tubing is a continuous length of copper tubing with an inlet and an outlet for passage of water therein.

8. An injection mold as defined in claim 7, where the metal plates are steel approximately 1/16 to ¼ inches thick and wherein the edge of each of the steel plates adjacent to the nickel surface approximates the shape of the nickel layer adjacent to that edge.

9. An injection mold comprising, in order,
(a) a first thin metallic layer forming an interior molding surface of the mold;
(b) a second thin metallic layer;
(c) a first thermoset plastic layer which contains (1) metal chips and (2) heat transfer tubing for the circulation of a heat transfer medium through the mold, wherein the tubing is adjacent to the second metallic layer;
(d) a second thermoset plastic layer; and
(e) a plurality of metal plates embedded within both the first and second thermoset plastic layers, said plates approximately perpendicular to the first and second metallic layers.

10. An injection mold as defined in claim 9, wherein the first metallic layer is nickel, the second metallic layer is formed of a material selected between copper and zinc, and the first and second thermoset plastic layers are epoxy.

11. An injection mold as defined in claim 10, wherein the nickel layer is at least 1/16 inches thick.

12. An injection mold as defined in claim 10, wherein the combined layers of the first and second metallic layers are at least ⅜ inches thick.

13. An injection mold as defined in claim 10, wherein the combined layers of the first and second metallic layers are ⅜ to ¾ inches thick.

14. An injection mold as defined in claim 12, wherein the nickel layer is approximately ⅛ inches thick.

15. An injection mold as defined in claim 10, wherein the metal chips are aluminum chips.

16. An injection mold as defined in claim 15, wherein the aluminum chips are flakes of about 1/16 to ⅜ by 1/16 to ⅜ by 0.010 to 0.050 inches.

17. An injection mold as defined in claim 10, wherein the tubing is a continuous length of copper tubing with an inlet and an outlet for passage of water therein.

18. An injection mold as defined in claim 10, where the metal plates are steel approximately 1/16 to ¼ inches thick and wherein the edge of each of the steel plates adjacent to the nickel surface approximates the shape of the nickel layer adjacent to that edge.

* * * * *